United States Patent
Gonzalez-Garcia et al.

(10) Patent No.: US 10,329,197 B2
(45) Date of Patent: *Jun. 25, 2019

(54) METHOD FOR A CURING CYCLE OF AN INORGANIC THERMOSET RESIN

(71) Applicant: The Boeing Company, Chicago, IL (US)

(72) Inventors: Ana Gonzalez-Garcia, Madrid (ES); Pedro Pablo Martin-Alonso, Torrejon de Ardoz (ES); Nieves Lapena-Rey, Madrid (ES); Amelia Martinez-Alonso, Oviedo (ES); Tomas Gonzalez Rodriguez, Oviedo (ES)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,313

(22) Filed: Jan. 13, 2017

(65) Prior Publication Data

US 2017/0204009 A1 Jul. 20, 2017

(30) Foreign Application Priority Data

Jan. 15, 2016 (EP) .................................... 16382017

(51) Int. Cl.
| | | |
|---|---|---|
| C04B 28/00 | (2006.01) | |
| C04B 20/02 | (2006.01) | |
| C04B 14/10 | (2006.01) | |
| C04B 22/16 | (2006.01) | |
| C08G 77/58 | (2006.01) | |
| C08L 83/14 | (2006.01) | |
| C08K 3/32 | (2006.01) | |
| C08K 7/02 | (2006.01) | |
| C08K 9/04 | (2006.01) | |
| C04B 103/63 | (2006.01) | |

(52) U.S. Cl.
CPC .......... C04B 28/006 (2013.01); C04B 14/106 (2013.01); C04B 20/023 (2013.01); C04B 22/16 (2013.01); C08G 77/58 (2013.01); C08K 3/32 (2013.01); C08K 7/02 (2013.01); C08K 9/04 (2013.01); C08L 83/14 (2013.01); C04B 2103/63 (2013.01)

(58) Field of Classification Search
CPC .................................................. C04B 28/006
See application file for complete search history.

(56) References Cited

U.S. PATENT DOCUMENTS

| | | | |
|---|---|---|---|
| 5,342,595 A | 8/1994 | Davidovits et al. | |
| 5,798,307 A | 8/1998 | Davidovits et al. | |
| 6,899,837 B2 | 5/2005 | Mazany et al. | |
| 6,969,422 B2 | 11/2005 | Mazany et al. | |
| 2012/0148824 A1 | 6/2012 | Martin et al. | |
| 2015/0190973 A1* | 7/2015 | Martin ................... | B28B 19/00 156/60 |

FOREIGN PATENT DOCUMENTS

| | | |
|---|---|---|
| EP | 0288502 B1 | 7/1991 |
| EP | 0815064 B1 | 9/1999 |
| EP | 2463083 A2 | 6/2012 |
| EP | 2894136 A1 | 7/2015 |
| JP | 2003206443 A | 7/2003 |
| WO | 03/087008 A2 | 10/2003 |
| WO | 2008/015361 A1 | 2/2008 |

OTHER PUBLICATIONS

European Patent Office Extended European Search Report, dated Jul. 9, 2018, for counterpart foreign application No. EP 18156449.3, Applicant The Boeing Company, 10 pages.

* cited by examiner

*Primary Examiner* — Douglas B Call

(57) ABSTRACT

A method for a curing cycle of an inorganic thermoset resin, the method comprising: (a) adding a hardener in a concentration from 18 to 30% by weight of the resin to said inorganic thermoset resin and (b) curing the resin at a temperature from 110 to 120° C. An inorganic thermoset resin, comprising a hardener in a concentration from 18 to 30% by weight of the resin. A vehicle interior panel, comprising a composite comprising a composite matrix of a natural fibre set within an inorganic thermoset resin.

20 Claims, 2 Drawing Sheets

METHOD FOR A CURING CYCLE OF AN INORGANIC THERMOSET RESIN

CROSS-REFERENCE TO RELATED APPLICATION

The present application claims priority to and is based on European Patent Application Serial Number EP16382017.8, filed Jan. 15, 2016, entitled A METHOD FOR A CURING CYCLE OF AN INORGANIC THERMOSET RESIN, which is incorporated herein by reference.

BACKGROUND

1) Field of the Disclosure

This description relates to methods for curing an inorganic thermoset resin using a short curing cycle. Particularly, this description relates to a method for curing an inorganic thermoset resin by adding a hardener to the resin and curing the resin at a selected temperature.

2) Description of Related Art

A geopolymer is an inorganic thermoset resin. This inorganic thermoset resin is essentially a mineral chemical compound consisting of repeating units, for example silico-oxide (—Si—O—Si—O—), silico-aluminate (—Si—O—Al—O—), ferro-silico-aluminate (—Fe—O—Si—O—Al—O—) or alumino-phosphate (—Al—O—P—O—), created through a process of geopolymerization.

Inorganic thermoset resins can be used for obtaining composite products. Different composite products can be obtained from inorganic thermoset resins. For example, vehicle interior panels can be obtained from geopolymeric resins. Aircraft, trains, automobiles, ships, and other vehicles may incorporate interior panels made from geopolymeric resins.

Inorganic thermoset resins have an outstanding fire performance.

Inorganic thermoset resins require hours (for example 2 hours) to cure at temperatures of about 80° C.

It is possible to improve the curing process by reducing the curing time.

SUMMARY

An aspect of the present description is a method for a curing cycle of an inorganic thermoset resin, the method comprising: (a) adding a hardener in a concentration from 18 to 30% by weight of the resin to said inorganic thermoset resin and (b) curing the resin at a temperature from 110 to 120° C.

Another aspect of the present description is an inorganic thermoset resin comprising a hardener in a concentration from 18 to 30% by weight of the resin.

A further aspect of the present description is a vehicle interior panel comprising a composite comprising a composite matrix of a natural fibre set within the inorganic thermoset resin of an aspect of the present description.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Figure 1:
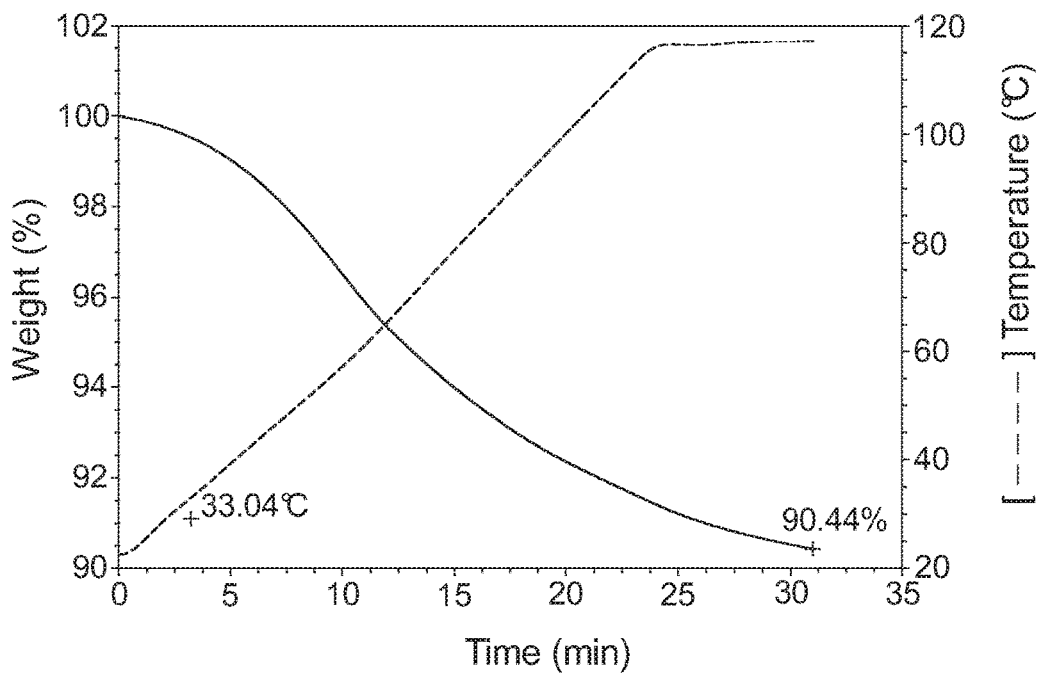
FIG. 1 is graph of a Differential Scanning Calorimetry (DSC) analysis of the geopolymeric resin of the disclosure and the weight results.

The present description provides a method for curing an inorganic thermoset resin, the method comprising: (a) adding a hardener in a concentration from 18 to 30% by weight of the resin to said inorganic thermoset resin and (b) curing the resin at a temperature from 110 to 120° C.

The technical effect associated to the distinguishing features of the present description with respect to the state of the art is a reduction in curing time.

The problem in view of the state of the art can be defined as the provision of a method for curing an inorganic thermoset resin with a reduced curing time compared to the state of the art.

The examples show that if the resin contains hardener at 15% by weight of the resin, at 80° C., more than 60 minutes are needed for curing the resin.

It the concentration of hardener is increased to 20% by weight of the resin, the curing cycle time at 80° C. is reduced to more than 30 minutes, which is very far from a curing cycle time of 8 minutes.

If the resin contains hardener in the range of 18-30% by weight of the resin in combination to a curing cycle at a temperature in the range of 110 to 120° C., then, surprisingly, the curing cycle time is drastically reduced to 8 minutes.

The examples show that, surprisingly, if the resin and the temperature are in these ranges, the polycondensation reaction is carried out, which accounts for the improved kinetics obtained with the features of the curing cycle of the present description.

The reduced curing time enables producing goods made of this resin at a production rate for 1 good/less than 10 minutes.

The curing cycle in less than 10 minutes allows the production of sustainable sidewall panels at industrial scale. The method of the present description enables production rates of 1 panel/less than 10 minutes. The method is feasible for aerospace industry.

An aspect of the present description is a method for a curing cycle of an inorganic thermoset resin, the method comprising: (a) adding a hardener in a concentration from 18 to 30% by weight of the resin to said inorganic thermoset resin and (b) curing the resin at a temperature from 110 to 120° C.

In the present description, the term "inorganic thermoset resin" include, but are not limited to silico-oxide (—Si—O—Si—O—) resins, silico-aluminate (—Si—O—Al—O—) resins, ferro-silico-aluminate (—Fe—O—Si—O—Al—O—) resins or alumino-phosphate (—Al—O—P—O—) resins.

In this aspect of the present description, the inorganic thermoset resin is preferably a silico-aluminate resin. Said silico-aluminate resin is of the type —Si—O—Al—O—.

In this aspect of the present description, curing time is from 5 to 20 minutes. Preferably, said curing time is from 5 to 10 minutes. More preferably, said curing time is from 7 to 8 minutes.

In the first aspect of the present description, the concentration of said hardener in step (a) is preferably from 18 to 25% by weight of the resin. More preferably, the concentration of said hardener in step (a) is from 19 to 24% by weight of the resin or from 20 to 23% by weight of the resin.

In the first aspect of the present description, the temperature in step (b) is preferably from 112 to 118° C. More preferably, the temperature in step (b) is from 114 to 116° C.

In a further aspect of the present description, the hardener, compatible with inorganic thermoset resins is selected from the group consisting of aluminium phosphate, copper phosphate, and mixtures thereof.

In a further aspect of the present description, an anti-shrinkage additive is added in step (a) to said inorganic thermoset resin. In an example of this aspect of the present description, said anti-shrinkage additive is aluminium silicate or metakaolin.

In a further aspect of the present description, the inorganic thermoset resin comprises halloysite nanotubes ($Al_2Si_2O_5(OH)_4$). Halloysite nanotubes may be added in replacement of an anti-shrinkage additive. Inorganic thermoset resins comprising halloysite nanotubes don't shrink during the resin curing.

In a further aspect of the present description, a natural fibre is added in step (a) to said inorganic thermoset resin. In an example of this aspect of the present description, said natural fibre is selected from the group consisting of flax, jute, hemp and sisal. In another example of this aspect of the present description, said natural fibre comprises a flame retardant. Said flame retardant is selected from the group consisting of disodium octaborate tetrahydrate ($Na_2B_8O_{13} \cdot 4H_2O$), phosphate nano-particles and nanographene. Preferably, the flame retardants are compatible with flax fibers.

In a further aspect of the present description, a flame retardant is added in step (a) to said aluminium silicate inorganic thermoset resin. In an example of this aspect of the present description, said flame retardant is selected from the group consisting of disodium octaborate tetrahydrate ($Na_2B_8O_{13} \cdot 4H_2O$), phosphate nano-particles and nanographene.

Another aspect of the present description is an inorganic thermoset resin comprising a hardener in a concentration from 18 to 30% by weight of the resin.

A further aspect of the present description, is wherein the hardener is selected from the group consisting of aluminium phosphate, copper phosphate, and mixtures thereof. The hardener forms a chemical bond between the inorganic thermoset resin (polymerization) during the curing process.

In a further aspect, the inorganic thermoset resin of the present description comprises an anti-shrinkage additive. Preferably, said anti-shrinkage additive is aluminium silicate or metakaolin.

Another aspect of the present description is a vehicle interior panel comprising a composite comprising a composite matrix of a natural fibre set within the inorganic thermoset resin of the second aspect of the present description.

A further aspect of the present description, is wherein said natural fibre is selected from the group consisting of flax, jute, hemp and sisal.

A further aspect of the present description, is wherein said natural fibre comprises a flame retardant. Preferably, said flame retardant is selected from the group consisting of disodium octaborate tetrahydrate ($Na_2B_8O_{13} \cdot 4H_2O$), phosphate nano-particles and nanographene. These examples have flame retardance-mechanisms compatible with natural fibers.

A further aspect of the present description, is wherein said vehicle is selected from the group consisting of an aircraft, a train, an automobile, and a ship.

EXAMPLES

Example 1

Differential Scanning Calorimetry (DSC) Analysis of the Geopolymeric Resin

Figure 2:
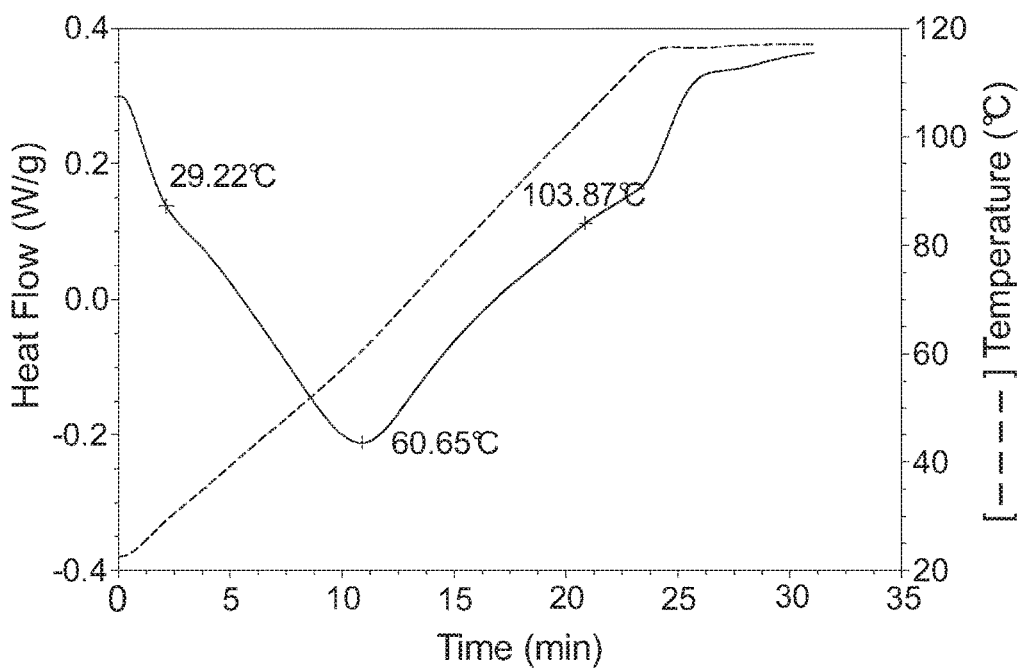
FIG. 2 is graph of a Differential Scanning Calorimetry (DSC) analysis of the geopolymeric resin of the disclosure and the heat flow results.
Figure 3:
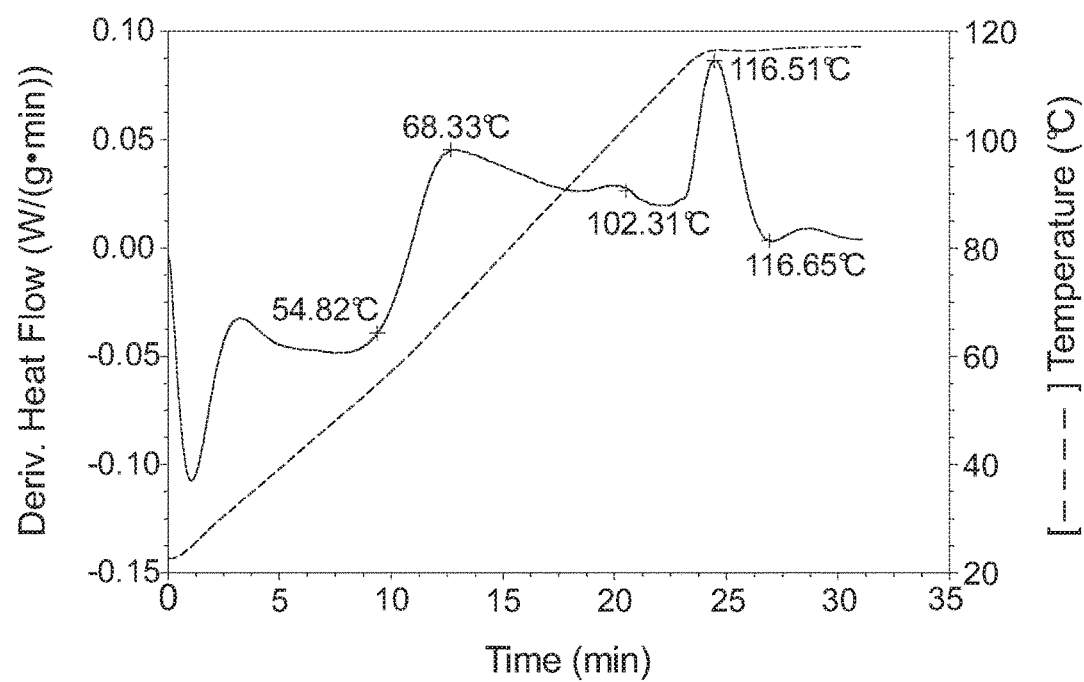
FIG. 3 is graph of a Differential Scanning Calorimetry (DSC) analysis of the geopolymeric resin of the disclosure and the derivative heat flow results.

A Differential Scanning Calorimetry (DSC) analysis of the geopolymeric resin (an inorganic thermoset resin, a silico-aluminate inorganic thermoset resin of the —Si—O—Al—O— type comprising 20% wt. of hardener (aluminium phosphate 20% by weight of the resin). The results (with the same resin sample) are provided in FIGS. 1, 2 and 3. The DSC results showed that the polymerization reaction between the hardener and the resin occurred in the 112-116° C. range.

The main processes and the type of reactions that occur during the DSC analysis are summarized in Table 1 (below).

TABLE 1

Summary of the DSC analysis of the geopolymeric resin.

| Type of process | Temperature range (° C.) | Type of reaction |
| --- | --- | --- |
| Endothermic | 55 | Water evaporation |
| Exothermic | 68 | Gel formation |
| Exothermic | 112-116 | Polycondensation reaction |

The DSC analysis allows concluding that the polymerization of the geopolymeric resin comprises three processes taking place at different temperatures.

At about 55° C., non-chemically bonded water is released.

At about 68° C., gels in the geopolymeric resin are reorganized (gel formation step).

In the 112° C.-116° C. range, the resin and the hardener polycondensates (polycondensation reaction between the hardener and the resin).

At 116° C. the overall mass loss is about 10% by weight of the resin.

Example 2

Preparation of a Geopolymeric Resin

The geopolymeric resin is obtained by mixing a silico-aluminate inorganic thermoset resin of the —Si—O—Al—O— type with a hardener (aluminium phosphate 20% by weight of the resin). An anti-shrinkage additive (metakaolin, 5% by weight with respect of the resin) is added to the resin.

A single step curing cycle of 115° C. during 8 min was carried out.

Example 3

Tests

The result of the curing cycle of Example 2, which is according to the description, is shown in the last row of Table 2.

Several comparative tests were carried out, not according to the description, in order to show the surprising effect achieved by the present description.

These tests are summarized in Table 2.

If the resin contains hardener at 15% by weight of the resin, at 80° C. and 60 minutes curing cycle, the resin is not cured. More than 60 minutes are needed for curing the resin.

If the resin contains hardener at 15% by weight of the resin, and a cycle of 80° C. 15 minutes+110° C. 15 minutes is used, the resin is cured.

If the resin contains hardener at 20% by weight of the resin, at 80° C. and 30 minutes curing cycle, the resin is not cured. More than 30 minutes are needed for curing the resin.

Surprisingly, if the resin contains hardener at 20% by weight of the resin, and the temperature is 115° C., the curing cycle is drastically reduced to 8 minutes.

TABLE 2

Comparative tests

| Curing cycle time | Hardener (% in wt.) | Temperature (° C.) | Curing state |
|---|---|---|---|
| 120 minutes | 10% | 80° C. | Uncured |
|  | 15% |  | Cured |
|  | 20% |  | Cured |
|  | 25% |  | Cured |
| 90 minutes | 10% | 80° C. | Uncured |
|  | 15% |  | Cured |
|  | 20% |  | Cured |
|  | 25% |  | Cured |
| 60 minutes | 10% | 80° C. | Uncured |
|  | 15% |  | Uncured |
|  | 20% |  | Cured |
|  | 25% |  | Cured |
| 30 minutes | 10% |  | Uncured |
|  | 15% |  | Uncured |
|  | 20% |  | Uncured |
|  | 25% |  | Uncured |
| 15 minutes + 15 minutes | 15% | 80° C. 15 minutes + 110° C. 15 minutes | Cured |
| 8 minutes | 20% | 115° C. | Cured |

Example 4

Boiling Water Tests (BWTs) on the Geopolymeric Resin

The Boiling Water Test (BWT) is a test procedure known by the skilled person that determines whether a thermoset inorganic resin has undergone a correct polymerization and, therefore, if it has properly cured. The appropriate polymerization of the resin is crucial for the applicability of the resin so it could also be considered as a screening test before fine tuning any process development for inorganic thermoset resins.

The test consists of introducing small pieces of the cured resin in boiled water during 20 minutes. There are two possible scenarios:

The samples of the cured resin do not suffer deformation or degradation after the boiling water tests, indicating the correct polymerization of the resin. In this case, the resin passes the Boiling Water Test, showing that the resin has properly cured.

The samples of cured resin suffer deformation or disintegration after (or before) the 20 min boiling water test, indicating that the resin has not polymerized. In this case the resin fails the BWT, showing that the resin has not properly cured.

To provide an accurate estimation of whether the samples suffer deformation and/or disintegration during such test, the diameter of the small pieces of cured resin samples subjected to the test are measured before and after the BWTs. This allows measuring any possible variation that the diameter of the cured samples could suffer at a millimeter scale.

Boiling Water Test Results:

Samples of the of the geopolymeric resin as disclosed in Example 2 were subjected to the BWTs in order to assess if the resin had properly polymerized. The resin successfully passed the BWTs since the cured resin samples show diameter resilience and no shape deformation after being immersed in boiling water. These results showed that the resin has polymerized correctly.

Example 5

Rheological Study of the Geopolymeric Resin

A rheological study of the resin as disclosed in Example 2 was performed. The results are compared to the results obtained with a resin with a hardener (aluminium phosphate) concentration of 15% (not according to the description, but for comparison).

The results, shown in Table 3, show that the viscosity obtained for the resin comprising 20% by weight of the hardener is similar to the viscosity obtained for the resin comprising 15% by weight of hardener.

TABLE 3

Rheological studies (at 150 rpm and 8 rpm) of geopolymeric resin.

| Amount of hardener | Viscosity at 150 rpm (21° C.) | Viscosity at 8 rpm (21° C.) |
|---|---|---|
| 15% wt. resin | 0.34 Pa*s | 1.04 Pa*s |
| 20% wt. resin | 0.25 Pa*s | 0.44 Pa*s |

Example 6

Preparation of a Product Comprising a Geopolymeric Resin and a Natural Fibre Treated with a Flame Retardant The product comprises an inorganic thermoset resin (a silico-aluminate inorganic thermoset resin of the —Si—O—Al—O— type) and a natural fibre treated with a flame retardant.

The resin comprises a hardener (aluminium phosphate 20% by weight of the resin) and an anti-shrinkage additive (metakaolin, 5% by weight with respect of the resin).

The natural fibre in this example is flax treated with the flame retardant disodium octaborate tetrahydrate ($Na_2B_8O_{13} \cdot 4H_2O$).

After mixing all the components of the product a single step curing cycle of 115° C. during 8 min was carried out.

What is claimed is:

1. A method for a single step curing cycle of an inorganic thermoset resin, the method comprising:
   (a) adding a hardener to the inorganic thermoset resin, the hardener being in a concentration from 18 to 30% by weight of the inorganic thermoset resin; and
   (b) curing the inorganic thermoset resin in a single step curing cycle by heating the inorganic thermoset resin at a single temperature in a temperature range from 110 to 120° C. for a curing time of from 5 to 20 minutes.

2. The method according to claim 1, wherein the hardener is selected from the group consisting of aluminium phosphate, copper phosphate, and mixtures thereof.

3. The method according to claim 1, further comprising adding an anti-shrinkage additive in step (a) to the inorganic thermoset resin.

4. The method according to claim 3, wherein the anti-shrinkage additive is aluminium silicate or metakaolin.

5. The method according to claim 1, further comprising adding a natural fibre in step (a) to the inorganic thermoset resin.

6. The method according to claim 5, wherein the natural fibre is selected from the group consisting of flax, jute, hemp, and sisal.

7. The method according to claim 5, wherein the natural fibre comprises a flame retardant.

8. The method according to claim 7, wherein the flame retardant is selected from the group consisting of disodium octaborate tetrahydrate ($Na_2B_8O_{13}.4H_2O$), phosphate nanoparticles, and nanographene.

9. The method according to claim 1 further comprising adding a flame retardant in step (a) to the inorganic thermoset resin.

10. The method according to claim 1, wherein in step (a), the hardener is in a concentration from 20 to 23% by weight of the inorganic thermoset resin.

11. The method according to claim 1, wherein in step (b), the curing time is from 5 to 10 minutes.

12. The method according to claim 1, wherein in step (b), the temperature range is from 112 to 118° C.

13. The method according to claim 1, wherein the inorganic thermoset resin comprises one of, silico-oxide resins, silico-aluminate resins, ferro-silico-aluminate resins, and alumino-phosphate resins.

14. The method according to claim 1, further comprising adding halloysite nanotubes in step (a) to the inorganic thermoset resin.

15. An inorganic thermoset resin, comprising a hardener in a concentration from 18 to 30% by weight of the inorganic thermoset resin, the inorganic thermoset resin cured in a single step curing cycle by heating the inorganic thermoset resin at a single temperature in a temperature range from 110 to 120° C. for a curing time of from 5 to 20 minutes.

16. The inorganic thermoset resin according to claim 15, wherein the hardener is selected from the group consisting of aluminium phosphate, copper phosphate, and mixtures thereof.

17. The inorganic thermoset resin according to claim 15, further comprising an anti-shrinkage additive.

18. A vehicle interior panel, comprising a composite comprising a composite matrix of a natural fibre set within the inorganic thermoset resin according to claim 15.

19. The vehicle interior panel according to claim 18, wherein the natural fibre comprises a flame retardant.

20. The vehicle interior panel according to claim 18, wherein a vehicle incorporating the vehicle interior panel is selected from the group consisting of an aircraft, a train, an automobile, and a ship.

* * * * *